United States Patent
Couturier et al.

(10) Patent No.: US 7,111,204 B1
(45) Date of Patent: Sep. 19, 2006

(54) PROTOCOL SLEUTHING SYSTEM AND METHOD FOR LOAD-TESTING A NETWORK SERVER

(75) Inventors: Russell L. Couturier, Worcester, MA (US); Patrick V. Johnstone, Westfield, MA (US)

(73) Assignee: Agilent Technologies, Inc., Palo Alto, CA (US)

( * ) Notice: Subject to any disclaimer, the term of this patent is extended or adjusted under 35 U.S.C. 154(b) by 590 days.

(21) Appl. No.: 10/210,798

(22) Filed: Aug. 1, 2002

Related U.S. Application Data

(60) Provisional application No. 60/309,382, filed on Aug. 1, 2001.

(51) Int. Cl.
G06F 11/00 (2006.01)

(52) U.S. Cl. .............. 714/39; 714/25; 718/105
(58) Field of Classification Search ........... 714/43, 714/39, 25
See application file for complete search history.

(56) References Cited

U.S. PATENT DOCUMENTS

| | | | |
|---|---|---|---|
| 6,260,065 B1 * | 7/2001 | Leiba et al. ............. 709/224 |
| 6,341,310 B1 * | 1/2002 | Leshem et al. ........... 709/223 |
| 6,360,332 B1 * | 3/2002 | Weinberg et al. ............ 714/4 |
| 6,434,513 B1 * | 8/2002 | Sherman et al. .......... 702/186 |
| 6,449,739 B1 * | 9/2002 | Landan ..................... 714/47 |
| 6,560,723 B1 * | 5/2003 | Matsui ..................... 714/39 |
| 6,694,288 B1 * | 2/2004 | Smocha et al. ........... 702/186 |
| 6,721,686 B1 * | 4/2004 | Malmskog et al. ........ 702/186 |
| 6,738,933 B1 * | 5/2004 | Fraenkel et al. ........... 714/47 |
| 6,754,701 B1 * | 6/2004 | Kessner ................... 709/219 |
| 6,772,107 B1 * | 8/2004 | La Cascia et al. .......... 703/21 |
| 6,799,213 B1 * | 9/2004 | Zhao et al. ............... 709/224 |
| 2002/0147805 A1 * | 10/2002 | Leshem et al. ........... 709/223 |
| 2002/0177977 A1 * | 11/2002 | Scarlat et al. ............ 702/186 |
| 2002/0198985 A1 * | 12/2002 | Fraenkel et al. .......... 709/224 |
| 2003/0009544 A1 * | 1/2003 | Wach ...................... 709/223 |
| 2003/0149765 A1 * | 8/2003 | Hubbard et al. .......... 709/224 |
| 2003/0231741 A1 * | 12/2003 | Rancu et al. ................ 379/9 |
| 2004/0039550 A1 * | 2/2004 | Myers ..................... 702/186 |

* cited by examiner

*Primary Examiner*—Robert Beausoliel
*Assistant Examiner*—Christopher McCarthy

(57) ABSTRACT

A protocol sleuthing system according to the present invention for load testing a network server includes a computer configured to interconnect with the network server, a protocol engine stored in and implemented by the computer and operative to generate a plurality of synthetic users, to generate a synthetic transaction in accordance with a specified protocol, and to cause each of the plurality of synthetic users to sequentially implement a plurality of the synthetic transactions with the network sever for load testing thereof, a configuration file connected to the protocol engine that includes variables required to generate the synthetic transaction, information that defines the behavior of the plurality of synthetic users implementing the synthetic transaction, and information that defines the number of synthetic users to be created by the protocol engine, and a module that is operative to monitor each of the plurality of synthetic transactions implemented by each of the plurality of synthetic users with the network server, to detect any error event occurring during any of the plurality of synthetic transactions implemented by any of the plurality of synthetic users, and to report any error event detected during such network testing.

15 Claims, 3 Drawing Sheets

| Client Application | Protocol | Server Application |
|---|---|---|
| CR1 → | connecting to host on address xyz | |
| | OK | ← SR1 |
| CR2 → | opening application on port abc | |
| | ERROR cannot open application on port abc | ← SR2E |
| CR5 → | Closing connection to host on address xyz | |
| | OK | ← SR5 |

PROTOCOL SLEUTHING SYSTEM AND METHOD FOR LOAD-TESTING A NETWORK SERVER

CROSS-REFERENCE TO RELATED APPLICATION

This application is based upon and claims the benefit of U.S. Provisional Application 60/309,382, filed 1 Aug. 2001, entitled Synthetic Transport Software.

FIELD OF THE INVENTION

The present invention is directed to network-testing technologies, and, more particularly, to a protocol sleuthing system and method for creating and implementing a plurality of 'synthetic users', each 'synthetic user' implementing a plurality of 'synthetic transactions' for cost and resource-effective load testing of a network server and the associated application services provided thereby. The protocol sleuthing system is concomitantly operative to monitor each 'synthetic transaction' and to detect and report any error events occurring during any 'synthetic transaction'.

BACKGROUND OF THE INVENTION

Concomitant with the wide spread use of computer networks and application services provided by network servers in today's society is the need to test, monitor, and evaluate the load capacity of such network servers, particularly in the context of providing application services requested by users.

Effective load testing of today's networks and associated application services requires a multiplicity of actual users simultaneously generating continuous transactions with any particular application available through a particular network server. It is, however, economically impracticable, both from a resource standpoint and a time standpoint, to conduct network load testing in such a manner.

Consider, for example, the resources required by an actual user in conducting one or more client-server transactions with a network server. FIG. 1 illustrates the hardware and application resources required for such client-server transactions. An actual user requires a computer PC that includes hardware for inputting requests, e.g., a keyboard for typing in the URL address of the network application to be accessed, hardware for displaying content, e.g., a monitor, and hardware for providing a communications interface with a network server computer NSC, e.g., a modem. A client application CA that includes a graphical user interface (GUI) with its associated drop-down menus and toolbars, e.g., a WEB browser such as Netscape Navigator, Microsoft Internet Explorer, or Opera, is stored on the personal computer PC and provides the necessary functionality for the user to conduct client-server transactions with a server application SA available from the network server computer NSC.

FIG. 2 illustrates a typical client-server transaction, using the resources illustrated in FIG. 1, wherein the actual user utilizes the client application CA, e.g., browser, stored on the computer PC to request HTML pages/files from the server application SA on a network server computer NSC, i.e., the actual user is surfing for information on the Internet. This client-server transaction consists of a series of defined protocol interactions between the browser (client application) and the server application, i.e., client requests and server responses to such client requests, in accordance with a standard protocol such as FTP (File Transfer Protocol). For example, referring to FIG. 2, the actual user initiates the protocol interactions defined for this particular client-server transaction by means of a request CR1 to connect to the network server computer NSC (by inputting the URL address "xyz" of the network server computer NSC via the client graphical user interface GUI, e.g., by keyboard inputs or clicking on a link). The network server computer NSC issues a response SR1 granting or denying this client request. Once connected to the network server computer NSC, the client requests that the server application SA be opened on a specific port number, e.g., "abc" (request CR2), and the server NSC responds by granting this request, i.e., response SR2. Next, the client requests a specific file, e.g., "www.mysite.com/myfile.html" by means of request CR3, and the server NSC responds by transmitting the requested file to the client computer PC. By means of client requests CR4 and CR5, and the server's responses thereto, i.e., responses SR4, SR5), the client-server transaction is voluntarily terminated by the user.

At any point in these protocol interactions, however, the server NSC can respond to any particular client request by means of an error message, i.e., the server denies a particular client request. Such a denial of a client request may be predicated on any number of diverse events, e.g., an authentication failure (initial request to establish a client-server relationship), a temporary lack of a server resource, e.g., CPU processing, memory, necessary to fulfill the client request, or a server application processing error. By way of example, refer to FIG. 3 which illustrates an error event occurring during the a client-server transaction of the type illustrated in FIG. 2. In this particular client-server transaction, the server NSC issues an error message, i.e., server response SR2E, in response to the client request CR2. A denial of a client request causes the client application CA to automatically terminate the protocol interactions, i.e., the client-server transaction, as illustrated by client request CR5 and the corresponding server response SR5 in FIG. 3. A premature termination of client-server transaction due to a denial of a client request/error message from the server NSC (or the lack of a response from the server NSC to a valid client request) is defined as an "error event".

Client-server transactions such as the foregoing are resource intensive, the graphical interface and display engines of a browser client application consuming extensive memory and CPU processing resources to support the graphical user interface, processing and transmission of application requests, and the display of content provided by the server. A single web browser, for example, can utilize as much as 10 Megabytes of memory during a single client-server transaction.

Network load testing is currently accomplished using the client resources and client-server transaction format described in the preceding paragraphs in conjunction with utility macros that record the user's interactions with the client and server applications, e.g., these macros record all user input (keystrokes, mouse movements and clicks) and relevant responses from the server application during the client-server transaction. These recorded macros are subsequently replayed to review and evaluate the information recorded by these macros. Because the user's interactions with the client and server applications are predominately graphical, detecting and isolating errors is time consuming and labor intensive. Since application graphical user interfaces do not typically include any means or mechanism for detecting error events, the detection of error events is a visual process.

To scale the foregoing load-testing scheme to provide valid load-testing data requires a large number of simulated users to generate statistically-sufficient data. However, each such simulated user for the foregoing load-testing would require the entire client application, including the graphical user interface. Accordingly, to simulate 100 web users in accordance with this load-testing scheme would require the client computer to instantiate 100 instances of the client application and the network server application, which would typically overwhelm the memory resources of the client computer. Therefore, because of excessive resource requirements, the foregoing load-scheme is not scalable to the extent necessary to generate statistically-valid data for network load testing.

A need exists to provide a means for load-testing network servers and the associated application services provided thereby that is not resource intensive. Such a means should be capable of being implemented using a single computer system. Such means should concomitantly enable monitoring, detecting, and reporting of error events detected during network load-testing

SUMMARY OF THE INVENTION

One object of the present invention is to provide a protocol sleuthing system that creates a plurality of synthetic users wherein each of the synthetic users generates a plurality of synthetic transactions in accordance with a specified protocol for load testing of a network server.

Another object of the present invention is to provide a means for monitoring each of the plurality of synthetic transactions generated by each of the plurality of synthetic users to detect any error events occuring during any of such synthetic transactions and reporting any error events detected during any of such synthetic transactions.

These and other objects are achieved by a protocol sleuthing system according to the present invention for load testing a network server that includes a computer configured to interconnect with the network server, a protocol engine stored in and implemented by the computer and operative to generate a plurality of synthetic users, to generate a synthetic transaction in accordance with a specified protocol, and to cause each of the plurality of synthetic users to sequentially implement a plurality of the synthetic transactions with the network sever for load testing thereof, a configuration file connected to the protocol engine that includes variables required to generate the synthetic transaction, information that defines the behavior of the plurality of synthetic users implementing the synthetic transaction, and information that defines the number of synthetic users to be created by the protocol engine, and a module that is operative to monitor each of the plurality of synthetic transactions implemented by each of the plurality of synthetic users with the network server, to detect any error event occurring during any of the plurality of synthetic transactions implemented by any of the plurality of synthetic users, and to report any error event detected during such network testing.

BRIEF DESCRIPTION OF THE DRAWINGS

These and other objects, features, and advantages of the present invention will be apparent from the following detailed description of preferred embodiments of the present invention when considered in conjunction with the accompanying drawings wherein.

DETAILED DESCRIPTION OF PREFERRED EMBODIMENTS

Figures 3, 4:
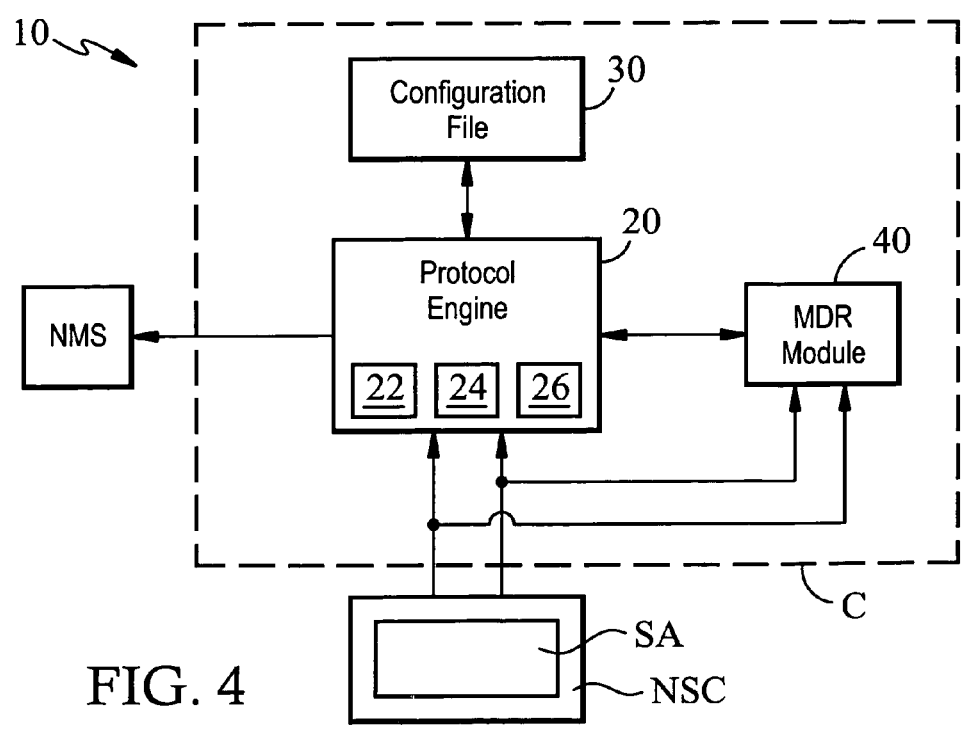
FIG. 3 illustrates an error event occurring during the client-server transaction illustrated in FIG. 2.
FIG. 4 illustrates a protocol sleuthing system according to the present invention.

Referring now to the drawings wherein like reference numerals indicate corresponding or similar elements throughout the several views, FIG. 4 illustrates one preferred embodiment of a system 10 for protocol sleuthing according to the present invention. The protocol sleuthing system 10 comprises a plurality of interactive components that provide the functionality necessary to create a plurality of 'synthetic users', to establish a client-server relationship and generate a sequential plurality of 'synthetic transactions' with a network server NS for each 'synthetic user', and to monitor each 'synthetic transaction' for the purpose of detecting and reporting any error event occurring during each such 'synthetic transaction'. The protocol sleuthing system 10 according to the present invention effectively provides a windowless background client that does not require any type of user interface to generate 'synthetic transactions' with a network server, i.e., the system 10 is not resource intensive. The protocol sleuthing system 10 according to the present invention provides the capability to create and implement a large number of 'synthetic users' on a single computer system, thereby providing the necessary scalability to ensure statistically-significant load testing of network servers and their associated application services.

The protocol sleuthing system 10 according to the present invention has utility for network load testing based upon client-server transactions in accordance with a standard protocol such as HTTP (Hypertext Transfer Protocol), FTP (File Transfer Protocol), SMTP (Simple Mail Transfer Protocol), POP3 (Post Office Protocol 3), IMAP (Internet Message Access Protocol), and NNTP (Network News Transfer Protocol). In addition to client-server transactions using a standard protocol, the protocol sleuthing system 10 according to the present invention also has utility in client-server transactions using a defined protocol ("defined" being used in the context that the protocol is documented, but not universally or generally used/accepted, e.g., a proprietary protocol used by an enterprise in intranet or extranet transactions—contrast with 'standard' which indicates a protocol established by general consent (or authority) as a general model or example that is universally or generally used/accepted).

The protocol sleuthing system 10 according to the present invention is implemented by means of a computer C and comprises a protocol engine 20, a configuration file 30, and a monitoring, detecting, and reporting (MDR) module 40.

The protocol engine 20, which can be stored in and implemented by a single computer C, is operative to generate plurality of 'synthetic users', and is further operative to cause each 'synthetic user' to generate multiple, sequential 'synthetic transactions' with the network server NSC in accordance with a specified protocol. Concomitantly, the protocol engine 20 is also operative to implement the MDR module 40 to continuously monitor each 'synthetic transaction' and to detect and report any error event occuring during any 'synthetic transaction'. The protocol engine 20 includes a first set of instructions 22, a second set of instructions 24, and a set of control instructions 26.

The first set of instructions 22 executed by the protocol engine 20 establish a client-server relationship with the network server NSC in accordance with a specified protocol. For example, where the 'synthetic transaction' is a file transfer request to the network server NSC in accordance with the File Transfer Protocol, the first set of instructions 22 executed by the protocol engine 20 implement the client requests CR1, CR2 exemplarily illustrated in FIG. 2 to establish a client-server relationship between the computer C and the network server NSC (see also FIG. 1). The protocol engine 20 is also operative to execute the first set of instructions 22 to terminate the client-server relationship, for example, at the successful conclusion of a 'synthetic transaction', as exemplarily illustrated by the client requests CR4, CR5 in FIG. 5. Or, as illustrated in FIG. 3, the protocol engine 20 is operative to execute the first set of instructions to terminate the client-server relationship upon the detection of an error event during the establishment of the client-server relationship, as exemplarily illustrated by the client request CR5 in FIG. 3.

The first set of instructions 22 can also include a subset of instructions for retrieving any variable(s) from the configuration file 30 necessary to establish the client-server relationship between the computer C and the network server NSC in accordance with a specified protocol. Most typically, such variables would include a user or login name and a password where the specified protocol requires an "authentication login protocol" as a prelude to establishing a client-server relationship. A representative instruction where the establishment of the client-server relationship requires an authentication login protocol is ftpget (username, password) where the parameters username and password are variables stored in the configuration file 30 (see discussion below regarding the configuration file 30).

One skilled in the art will appreciate that the specifics regarding the first set of instructions 22 executed by the protocol engine 20 depend upon the protocol required for the implementation of a particular 'synthetic transaction'. One skilled in the art will be able to generate the first set of instructions 22 necessary to establish a client-server relationship with any network server in accordance with a specified protocol without undue experimentation.

The second set of instructions 24 executed by the protocol engine 20 accomplish the task or tasks defined by the 'synthetic transaction' in accordance with the specified protocol. For example, where the 'synthetic transaction' is a file transfer request to the network server NSC in accordance with the File Transfer Protocol, the second set of instructions 24 executed by the protocol engine 20 accomplish the task of transferring a particular file from the network server NSC to the computer C. To accomplish this task, the second set of instructions 24 would implement the client request CR3 exemplarily illustrated in FIG. 2 to request that the network server NSC transfer a copy of the particular file, e.g., "myfile", to the computer C.

Where the network server NSC transfers the requested content, e.g., "myfile", to the computer C as part of the 'synthetic transaction', the second set of instructions 24 executed by the protocol engine 20 are further operative to ensure that such transferred content does not encumber the memory resources of the computer C. For example, the second set of instructions 24 can be designed to immediately delete such transferred content or may be designed to direct such transferred content to the recycle bin of the computer C.

In accomplishing any particular task or tasks defined by the 'synthetic transaction' in accordance with the specified protocol, the protocol engine 20 may require one or more variables in carrying out the task or tasks defined by the 'synthetic transaction'. The second set of instructions 24, therefore, includes a subset of instructions for retrieving any variables necessary in accomplishing such task or tasks comprising the 'synthetic transaction' from the configuration file 30. For example, where the 'synthetic transaction' is a file transfer request to the network server NSC in accordance with the File Transfer Protocol to retrieve a particular file as exemplarily illustrated in FIG. 2, this subset of instructions would be operative to retrieve variables identifying the directory where the particular file is stored, the filename of the particular file, and the filetype of the particular file. An illustrative, generic example of such a retrieval instruction executed by the protocol engine 20 under this circumstance is ftpget (directory, filename, filetype) where the parameters directory, filename, and filetype are variables stored in the configuration file 30. Retrieved variables are utilized in the second set of instructions 24 as required to accomplish the task or tasks defined by the 'synthetic transaction' in accordance with the specified protocol.

One skilled in the art will appreciate that the specifics regarding the task or tasks accomplished by means of the second set of instructions 22 executed by the protocol engine 20 depend upon the protocol specified for any particular 'synthetic transaction'. One skilled in the art will be able to generate the second set of instructions 22 necessary to accomplish any such task or tasks specified for any particular 'synthetic transaction' in accordance with a specified protocol without undue experimentation.

The configuration file 30 comprises stored information and data (variables) for a particular 'synthetic transaction'. The configuration file 30 can reside in any primary or secondary storage element, e.g., memory, cache, disk, network storage, network message, accessible to the protocol engine 20 running on the computer C (if the configuration file 30 resides in secondary storage, the protocol engine 20 would preferably move the configuration file 30 to primary storage prior to executing the first set of instructions 22). The variables (data) required to generate a particular 'synthetic transaction' in accordance with a specified protocol are stored in the configuration file 30. In addition to storage of the variables required for any particular 'synthetic transaction', the configuration file 30 has stored therein: (1) information that defines the behavior of a 'synthetic user' implementing the 'synthetic transaction'; e.g., how many times the each 'synthetic user' is to generate the 'synthetic transaction', any other actions to be taken by each 'synthetic user' in conjunction with the 'synthetic transaction' (the terminology "other actions" as used herein means a function or functions performed by the 'synthetic user' that is not part of the specified protocol), and (2) information that defines the 'background client' implemented by the protocol sleuthing system 10, i.e., how many 'synthetic users' will be generated by the protocol engine 20.

Figures 1, 2:
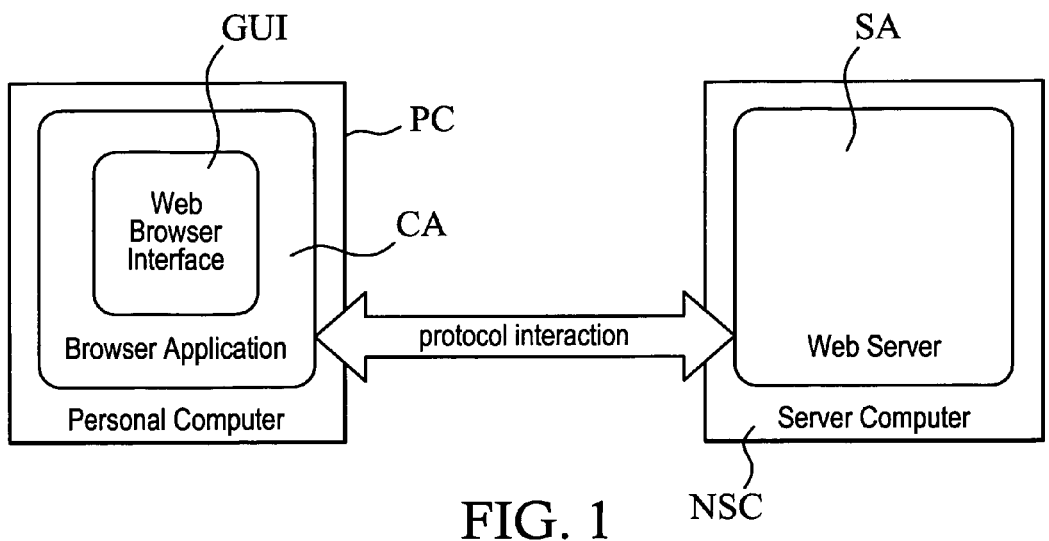
FIG. 1 illustrates the hardware and application resources required by a user for a client-server transaction with a network server.
FIG. 2 illustrates a representative protocol for a client-server transaction using the resources of FIG. 1.

For example, with reference to a 'synthetic transaction' that is a file transfer request to the network server NSC in accordance with the File Transfer Protocol to retrieve a particular file, e.g., "myfile.html", as exemplarily illustrated in FIG. 2, the following variables would be stored in the configuration file 30 (# denotes a comment stored in conjunction with the variable):

| | |
|---|---|
| User russ | #Use this as the login name |
| Password secret | #Use this as the password |
| Filetype htm (or html) | #The file is an htm (or html) file |
| Directory / | #Use the default directory |
| Filename myfile.html | #Retrieve this file |

The following illustrative information defining the behavior of the 'synthetic user' is stored in the configuration file 30 in the context of such a file transfer request is:

| | |
|---|---|
| Repeat 50 | #Repeat the file transfer 50 times |
| WaitAfterLoop10 | #Wait 10 seconds after each file transfer to simulate think time ("other action" part of the 'synthetic transaction') |

The following illustrative information defining the 'background client' is stored in the configuration file 30:

| | |
|---|---|
| Clones 1000 | #Create 1000 instances of this synthetic user. |

The foregoing configuration file 30 information and data defines a 'background client' that consists of 1000 'synthetic users', each 'synthetic user' implementing a 'synthetic transaction' 50 times, where each 'synthetic transaction' consists of a file transfer request, e.g., for file "myfile.html", followed by a pause period of 10 seconds.

Figure 5:
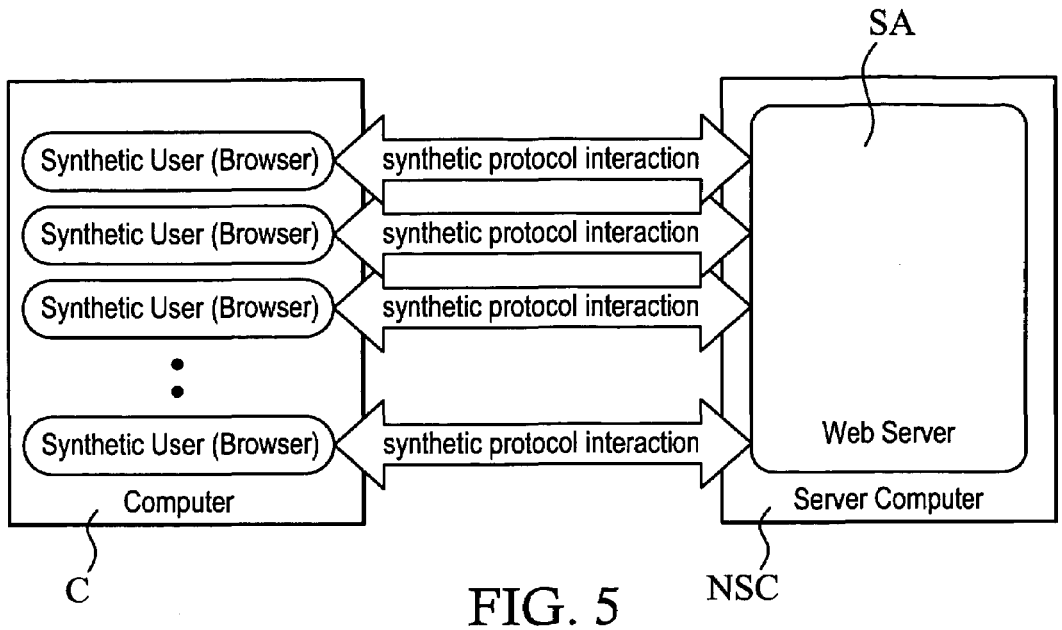
FIG. 5 is an illustrative example of the implementation of a 'background client' consisting of four 'synthetic users' interacting with an application available through a network server.

The protocol engine 20 executes the set of control instructions 26 to implement the 'background client'. In the first instance, the set of control instructions 26 are executed to create the number of 'synthetic users' defined by the 'background client'. Next, the set of control instructions 26 cause the protocol engine 20 to execute the first set of instructions 22 with respect to each 'synthetic user' to establish a client-server relationship between each 'synthetic user' and the network server NSC in accordance with the specified protocol (including the retrieval of any variables required to establish the client-server relationship from the configuration file 30). Next, the set of control instructions 26 cause the protocol engine 20 to execute the second set of instructions 24 with respect to each 'synthetic user' to implement the behavior of the 'synthetic users', i.e., accomplish the task or tasks defined by the 'synthetic transaction' in accordance with the specified protocol (including the retrieval of any variables required to accomplish any task or tasks defined by the 'synthetic transaction'). Next, the set of control instructions 26 cause the protocol engine 20 to repeat the execution of the second set of instructions 24 with respect to each 'synthetic user' as defined in the configuration file 30, i.e., to cause each 'synthetic user' to implement the number of 'synthetic transactions' defined by the configuration file 30 (e.g., 50 'synthetic transactions' in the illustrative 'synthetic transaction' described above). Finally, upon completion of the second set of instructions 24, i.e., the number of 'synthetic transactions' defined by the configuration file 30 has been completed, the control instructions 26 cause the protocol engine 20 to executes the first set of instructions 24 to terminate the client-server relationship for each 'synthetic user'. An illustrative example of the implementation of a 'background client' consisting of four 'synthetic users' is depicted in FIG. 5.

One skilled in the art will be able to generate the second set of instructions 22 necessary to implement a 'background client' in accordance with the teachings of the present invention without undue experimentation.

The protocol engine 20 is further operative to implement the MDR module 40 during the execution of the first and second sets of instructions 22, 24 by the protocol engine 20 operating under the set of control instructions 26. For purposes of facilitating a more complete understanding of this aspect of the protocol sleuthing system 10 according to the present invention, the MDR module 40 is depicted as an element separate and distinct from the protocol engine 20. For this embodiment, the protocol engine 20 use APIs to implement the functionality of the MDR module 40. Alternatively, the functionality of the MDR module 40 could be implemented as another set of instructions stored in the protocol engine 20.

The MDR module 40 is operative to monitor each client-server interaction during establishment of the client-server relationship between each 'synthetic user' and the network server NSC and to monitor each client-server interaction between each 'synthetic user' and the network server NSC during each 'synthetic transaction'. The MDR module 40 is further operative to detect any 'error event', i.e., error code, that occurs during any of the foregoing client-server interactions. For example, referring to FIG. 3, an exemplary 'error event' (as a result of the FTP application of the network server NSC having insufficient memory resources to respond to the 'synthetic user' request CR2 to open the application on port abc) that occurs during the establishment of the client-server relationship for any particular 'synthetic user' is illustrated. This exemplary 'error event' is transmitted to the particular 'synthetic user' by the network server NSC as a response SR2 to the 'synthetic user' request CR2. The MDR module 40 is operative to detect this 'error event' as an anomaly in the context of the expected client-server interactions defined by the specified protocol. Finally, MDR module 40 is operative to provide notification of this anomalous occurrence, i.e., the 'error event', as well as an identification of the network server NSC and any relevant context information that can facilitate the isolation/identification of the particular application on the network server NSC responsible for the 'error event' to an appropriate application for subsequent processing, e.g., an application stored at the network management station NMS, as exemplarily illustrated in FIG. 4. 'Error event' reporting can be effected via the protocol engine 20, as illustrated in FIG. 4, or can be effected directly between the MDR module 40 and the network management station NMS.

Figure 6:
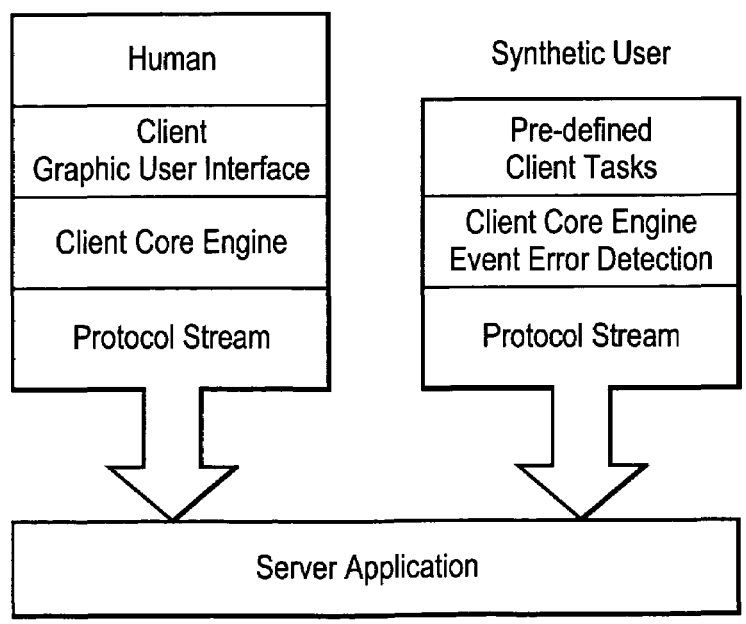
FIG. 6 illustrates the differences between a client-server transaction conducted by a human and a client-server transaction implemented by a background client via the protocol sleuthing system and method according to the present invention.

FIG. 6 illustrates the differences between a client-server transaction conducted by an actual user and a client-server transaction implemented by a background client via the protocol sleuthing system and method according to the present invention. Since there is no human associated with any 'synthetic user', there is no need for a user interface, graphic display, or permanent storage of any content provided by a network server application utilizing the protocol sleuthing system 10 and method according to the present invention. The protocol sleuthing system 10 and method according to the present invention uses substantially less resources in terms of memory and CPU utilization, which allows large numbers of 'synthetic users' to be generated via a single client computer.

A variety of modifications and variations of the protocol sleuthing system and method according to the present invention, as described above, are possible. It is therefore to be understood that, within the scope of the claims appended hereto, the present invention may be practiced other than as expressly described herein.

What is claimed is:

1. A protocol sleuthing system for load testing a network server, comprising:
    a protocol engine, configured for implementation by means of a computer, is operative to generate a plurality of synthetic users, to generate a synthetic transaction in accordance with a specified protocol, and to cause each of the plurality of synthetic users to sequentially implement a plurality of the synthetic transactions with the network sever for load testing thereof;
    a configuration file connected to the protocol engine that includes variables required to generate the synthetic transaction, information that defines the behavior of the plurality of synthetic users implementing the synthetic transaction, and information that defines the number of the plurality of synthetic users to be created by the protocol engine; and
    a module that is operative to monitor each of the plurality of synthetic transactions implemented by each of the plurality of synthetic users with the network server, to detect any error event occurring during the plurality of synthetic transactions implemented by the plurality of synthetic users, and to report any error event detected during the load testing; wherein the protocol engine is operative to ensure that content transferred from the network server does not encumber memory associated with the computer.

2. The protocol sleuthing system of claim 1 further comprising:
    a computer configured to connect with the network server and operative to implement the protocol engine, causing each of the plurality of synthetic users to sequentially implement the plurality of the synthetic transactions with the network sever for load testing thereof;
    the computer system being further operative to implement the module wherein each of the plurality of synthetic transactions implemented by each of the plurality of synthetic users with the network server is monitored to detect any error event occurring during any of the plurality of synthetic transactions implemented by any of the plurality of synthetic users and report any error event detected during such network testing.

3. The protocol sleuthing system of claim 1 wherein the protocol engine comprises a first set of instructions for establishing a client-server relationship with the network server for each of the plurality of synthetic users.

4. The protocol sleuthing system of claim 1 wherein the protocol engine comprises a second set of instructions for accomplishing one or more tasks defined by the synthetic transaction in accordance with the specified protocol.

5. The protocol sleuthing system of claim 1 wherein the protocol engine comprises a first and second set of instructions for establishing a client-server relationship with the network server for each of the plurality of synthetic users and for accomplishing one or more tasks defined by the synthetic transaction in accordance with the specified protocol.

6. The protocol sleuthing system of claim 5 wherein the protocol engine further comprises a set of control instructions for executing the first and second set of instructions to cause each synthetic user to sequentially implement the plurality of the synthetic transactions with the network server for load testing thereof.

7. The protocol sleuthing system of claim 1 wherein the specified protocol comprises a standard protocol.

8. The protocol sleuthing system of claim 1 wherein the information that defines the behavior of the plurality of synthetic users sequentially implementing the plurality of synthetic transaction comprises the number of implementations of the synthetic transaction by each of the plurality of synthetic users.

9. The protocol sleuthing system of claim 1 wherein the information that defines the behavior of the plurality of synthetic users sequentially implementing the plurality of synthetic transaction comprises the number of implementations of the synthetic transaction by each of the plurality of synthetic users.

10. A protocol sleuthing system for load testing a network server, comprising:
    a computer configured to interconnect with the network server;
    a protocol engine stored in and implemented by the computer to generate a plurality of synthetic users, to generate a synthetic transaction in accordance with a specified protocol, and to cause each of the plurality of synthetic users to sequentially implement a plurality of the synthetic transactions with the network sever for load testing thereof;
    a configuration file connected to the protocol engine that includes variables required to generate the synthetic transaction, information that defines the behavior of the plurality of synthetic users implementing the synthetic transaction, and information that defines the number of synthetic users to be created by the protocol engine; and
    a module implemented by the computer to monitor each of the plurality of synthetic transactions implemented by each of the plurality of synthetic users with the network server to detect any error event occurring during any of the plurality of synthetic transactions implemented by any of the plurality of synthetic users report any error event detected during the load testing; wherein the protocol engine is operative to ensure that content transferred from the network server does not encumber memory associated with the computer.

11. The protocol sleuthing system of claim 10 wherein the protocol engine comprises a first set of instructions for establishing a client-server relationship with the network server for each of the plurality of synthetic users.

12. The protocol sleuthing system of claim 10 wherein the protocol engine comprises a second set of instructions for accomplishing one or more tasks defined by the synthetic transaction in accordance with the specified protocol.

13. The protocol sleuthing system of claim 10 wherein the protocol engine comprises a first and second set of instructions for establishing a client-server relationship with the network server for each of the plurality of synthetic users and for accomplishing one or more tasks defined by the synthetic transaction in accordance with the specified protocol.

14. The protocol sleuthing system of claim 13 wherein the protocol engine further comprises a set of control instructions for executing the first and second set of instructions to cause each synthetic user to sequentially implement the plurality of synthetic transactions with the network sever for load testing thereof.

15. The protocol sleuthing system of claim 10 wherein the specified protocol comprises a standard protocol.

* * * * *